United States Patent [19]

Turney

[11] 4,129,988
[45] Dec. 19, 1978

[54] TIDAL POWER PLANT OR THE LIKE

[76] Inventor: Sayles A. Turney, Rancho Grande, North Fork, Nev. 89801

[21] Appl. No.: 818,554

[22] Filed: Jul. 25, 1977

[51] Int. Cl.² .......................................... F03B 13/12
[52] U.S. Cl. ..................................... 60/499; 60/497
[58] Field of Search .............................. 60/497–507; 417/330, 331, 332, 333, 337; 290/53

[56] References Cited

U.S. PATENT DOCUMENTS

| 281,370 | 7/1883 | Jory | 60/506 |
| 725,887 | 4/1903 | Smetana | 60/497 |
| 773,285 | 10/1904 | Goedecke | 60/507 |
| 1,259,845 | 3/1918 | Furness | 60/501 |
| 1,617,571 | 2/1927 | Caldwell | 60/502 |
| 1,822,806 | 9/1931 | Geary | 60/507 |

Primary Examiner—Allen M. Ostrager
Attorney, Agent, or Firm—Mallinckrodt & Mallinckrodt

[57] ABSTRACT

A buoyant body is carried by one or more stationary shafts that extend obliquely and freely, from securement adjacent to an end or ends thereof, in a body of water whose surface level varies with time. Each shaft extends through at least that depth portion of such body of water which comprehends the variations in surface level, and is interconnected with the buoyant body by means encircling the shaft for movement longitudinally therealong. Means are provided for converting into rotational energy the longitudinal travel of the buoyant body along the shaft as such buoyant body rises and falls with variations in water level.

10 Claims, 11 Drawing Figures

TIDAL POWER PLANT OR THE LIKE

BACKGROUND OF THE INVENTION

1. Field

The invention is in the field of apparatus for obtaining power from bodies of water whose surface levels vary with time, such as the ocean which rises and falls with the tides.

2. State of the Art

Many attempts have been made to harness the energy of rising and falling water, such as the rising and falling of the ocean due to tides. Such systems, however, have not yet obtained wide acceptance as a viable source of energy, and room for improvement in such systems remain.

SUMMARY OF THE INVENTION

According to the invention, apparatus for obtaining energy from a body of water whose surface level varies from time to time, comprises a buoyant body adapted to float in the water and carried by one or more stationary shafts which are secured at an oblique angle to the surface of the water and extend freely through the water. The shafts extend through the full range of vertical travel of the buoyant body in the water as it rises and falls.

The buoyant body and the shafts are interconnected by means, such as sleeves, that rotatably encircle the respective shafts, so that, as the buoyant body rises and falls, it travels longitudinally along the shafts. Means are provided to convert the longitudinal travel of the buoyant body and the interconnecting means along the shafts into rotational energy. Such means include formations, such as helical grooves, on the respective shafts and interengaging formations, such as rollers, on the respective sleeves. As the rotatable interconnecting means travel along the respective shafts by reason of movements of the buoyant body upwardly or downwardly with change in surface level of the body of water, they are caused to rotate. The rotational energy may be utilized in various ways, such as for turning a generator to produce electrical power.

THE DRAWINGS

In the accompanying drawings, which represent the best mode presently contemplated of carrying out the invention:

FIG. 1 is a view in side elevation of the apparatus of the invention installed in a body of water subject to ocean tides;

FIG. 2, a fragmentary top plan view;

FIG. 3, a fragmentary vertical section taken on the line 3—3 of FIG. 2;

FIG. 4, a fragmentary portion of FIG. 2 drawn to a larger scale;

FIG. 5, a fragmentary vertical section taken on the line 5—5 of FIG. 4;

FIG. 6, a view corresponding to that of FIG. 4 but of an embodiment having a fly wheel between transmission and generator;

FIG. 7, a view similar to that of FIG. 1, but showing a somewhat different installation of apparatus of the invention;

FIG. 8, a view corresponding to that of FIG. 5, but showing an embodiment having somewhat different means for converting longitudinal travel of the buoyant body into rotational energy;

FIG. 9, a top plan view corresponding to a fragmentary portion of a different embodiment of the invention;

FIG. 10, a fragmentary vertical section taken on the line 10—10 of FIG. 9; and

FIG. 11, a fragmentary vertical section taken on the line 11—11 of FIG. 9.

DETAILED DESCRIPTION OF THE ILLUSTRATED EMBODIMENTS

Figure 1:
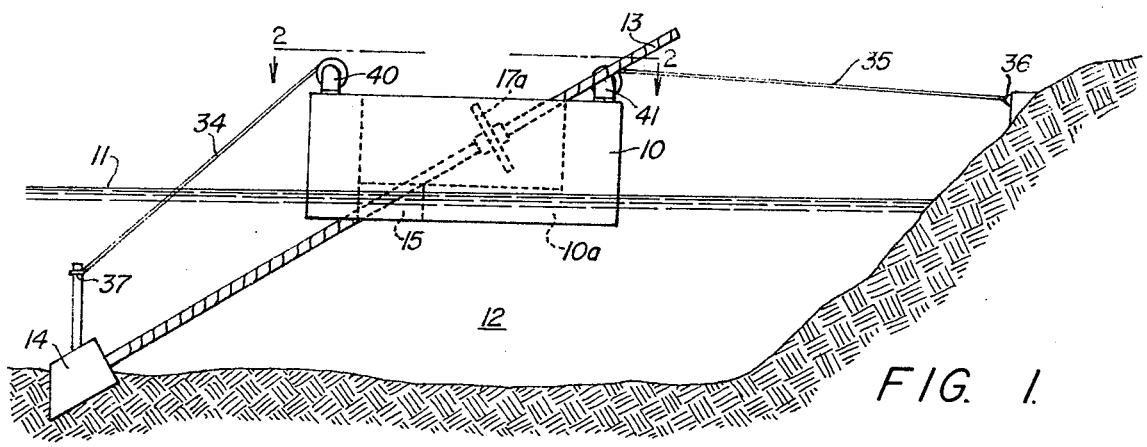
Figure 2:
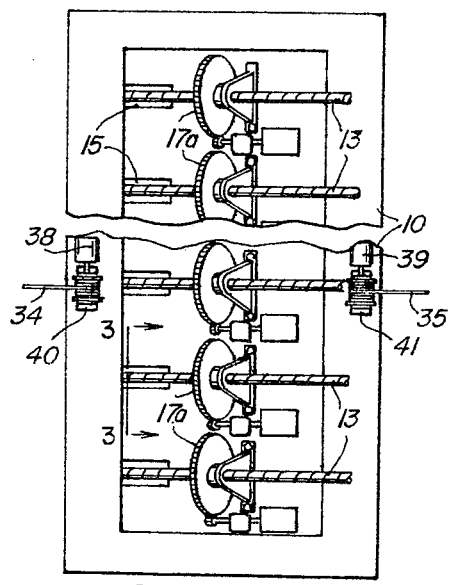
Figure 3:
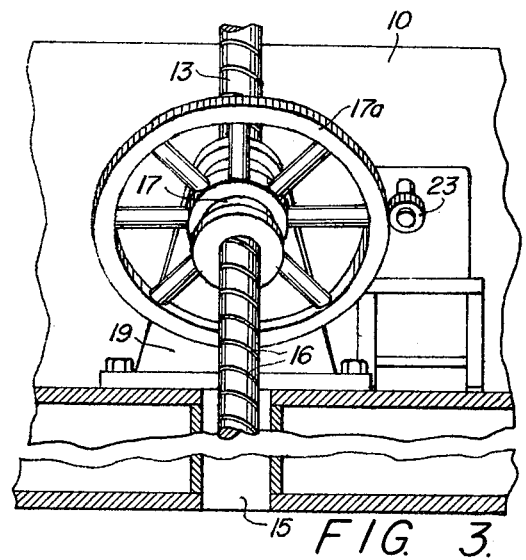
Figure 4:
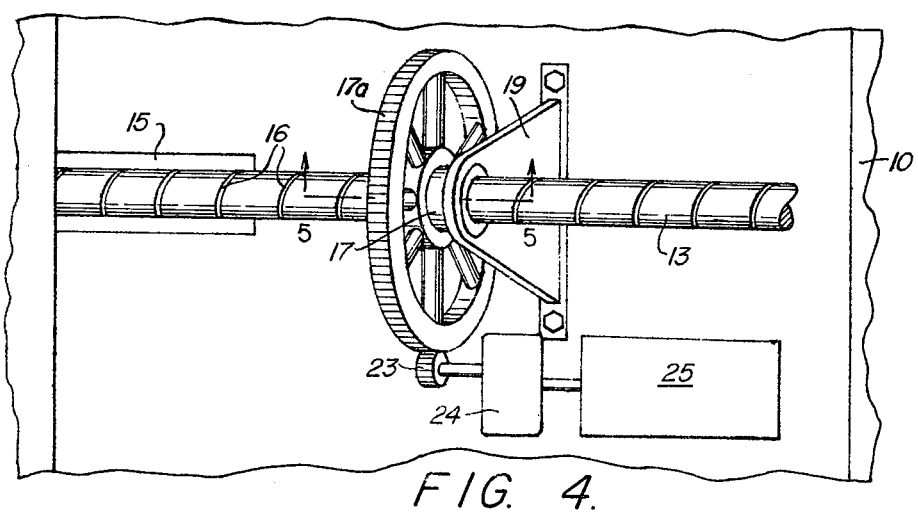

In the embodiment of FIGS. 1—5, an apparatus of the invention is shown installed in an ocean tidal basin wherein the surface level of the water rises and falls with the tides. As shown, the apparatus comprises a buoyant body 10 adapted to float on the surface 11 of the body of water 12. Shafts 13 are secured at one set of ends in a concrete footing 14, and extend freely upwardly at an oblique angle to the surface of the water through respective openings 15 in buoyant body 10.

Buoyant body 10 may be of any required size considering its construction and the material from which it is made. As shown, it is of the nature of an ocean-going barge having air chambers 10a of adequate size to provide buoyancy. The number of shafts 13 which extend through buoyant body 10 is variable and may range from one up to any feasible number, considering the overall size of the buoyant body.

In this illustrated embodiment, each shaft 13 is provided with and encircled by a helical groove 16 extending along the length thereof, and is further encircled by a relatively short sleeve 17, which, in this instance provides, in effect, the hub of a bull gear 17a. Hub 17 is rotatably mounted in buoyant body 10 by bearings 18, FIG. 5, of pillow blocks 19. Sleeves 17 are freely rotatable on the respective shafts 13 and are free to travel along shafts 13 with rise and fall of buoyant body 10, but are attached securely to the buoyant body by the pillow blocks, as shown, so they move the buoyant body longitudinally along the shafts.

Sleeves 17 thus serve to interconnect buoyant body 10 and shafts 13, and helical grooves 16 serve as part of means for converting longitudinal travel of such buoyant body along the shafts into rotational energy.

Figure 5:
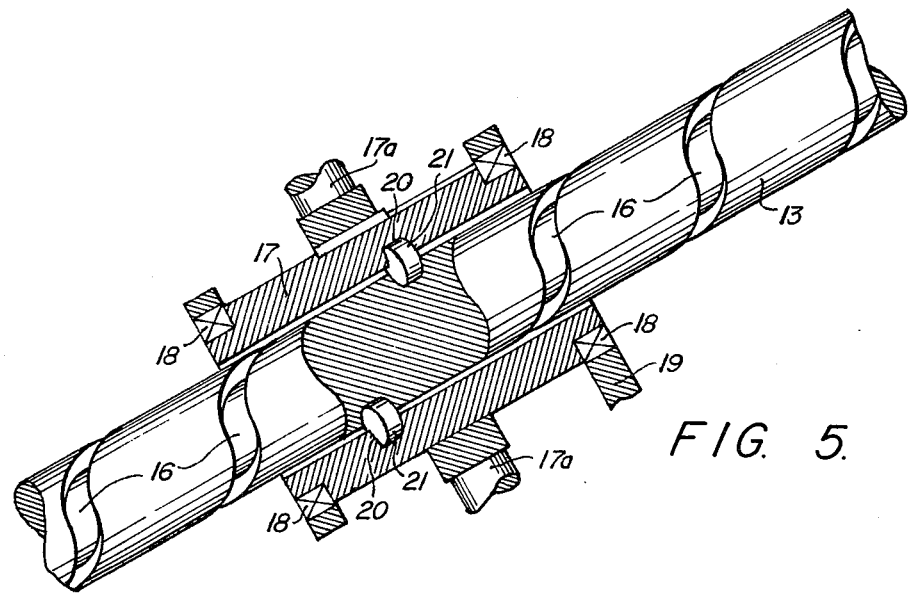

To provide for a coacting part of such means, the inside of sleeves 17 are provided with indentations 20, FIG. 5, which follow portions of the lengths of the respective helical grooves 16 in shafts 13. In each indentation 20, a roller 21 is provided, which extends from such indentation into the confronting portion of the corresponding helical groove 16. With rollers 21 in place as coacting parts of the motion converting means, they will follow helical grooves 16 and cause sleeves 17 and bull gears 17a to rotate. The rate of rotation will depend upon the speed of longitudinal travel of sleeves 17 along shafts 13 and the pitch of helical grooves 16.

It should be noted that the arrangement shown, utilizing indentations 20 with rollers 21 which fit into helical grooves 16, is merely one way of interconnecting sleeves or hubs 17 and shafts 13 so that the longitudinal travel of hubs 17 along shafts 13 is converted into rotational energy. It is a preferred way of interconnection, because it reduces the friction that would be present if merely a sliding surface contact was maintained in grooves 16.

Figure 8:
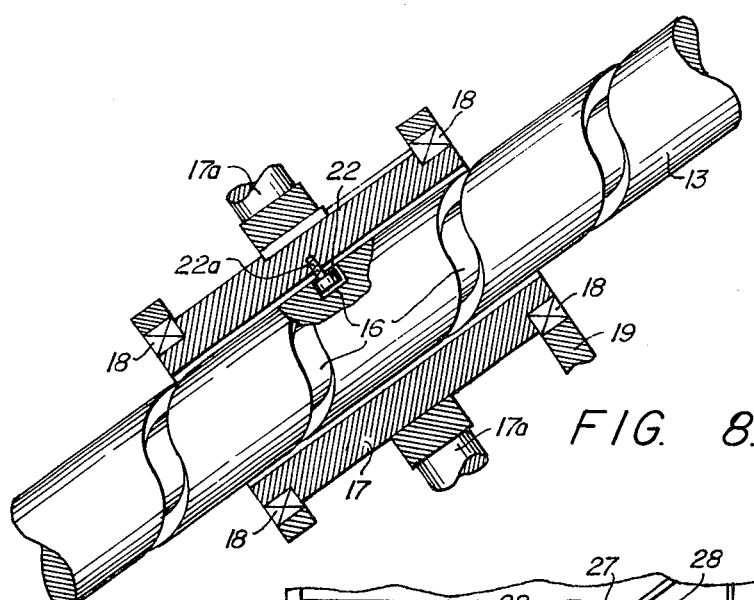

A somewhat different arrangement is illustrated in FIG. 8, where corresponding rollers, 22, are journaled on stub shafts, 22a, so that they fit into grooves 16 and are adapted to roll against the walls thereof. Rollers 22 have diameter such that they rest against only one wall of groove 16 for free rotation thereagainst. When sleeve or hub 17 moves in one direction relative to shaft 13, rollers 22 will roll against one side wall of groove 16. However, when direction of hub travel is reversed, they will roll against the opposite wall of groove 16.

Shafts 13 are placed at an oblique angle to the surface of the body of water so that a greater longitudinal travel along the shaft is obtained for each unit change in surface level of the water than would be the case if the shafts were placed vertically. This causes a great number of rotation for sleeves or hubs 17 for each unit rise or fall of buoyant body 10.

Once longitudinal travel along shafts 13 has been converted to rotational energy, such rotational energy may be put to use in various ways. As illustrated, pinion gears 23 are arranged to mesh with the respective bull gears 17a and to drive power transmissions 24, which, in turn, serve to drive electric generators 25, all feeding into a common power storage or distribution system (not shown).

It should be noted that power transmissions 24 are of a type that will put out unidirectional rotation regardless of which direction of rotation the input drive is. This is so because, as buoyant body 10 rises, pinion gears 23 will rotate in one direction, but, as buoyant body 10 drops, rotation of pinion gears 23 will be in the opposite direction.

Figure 6:
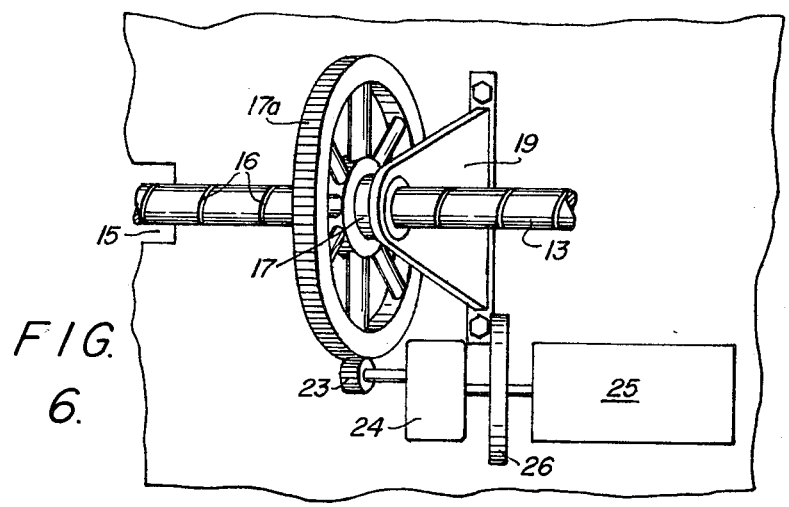

As shown in FIG. 6, a fly wheel 26 may be installed between the power transmission 24 and the generator 25 of each set. The fly wheels serve to stabilize the transmission of power.

Figure 9:
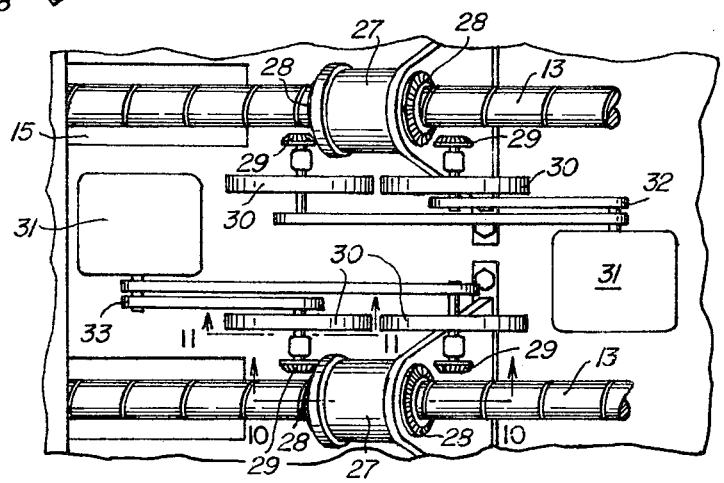
Figure 11:
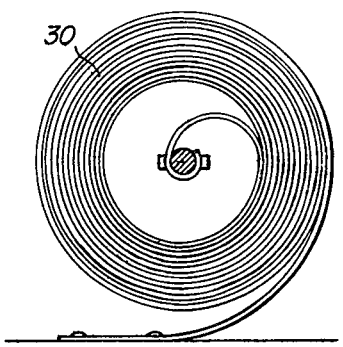
Figure 10:
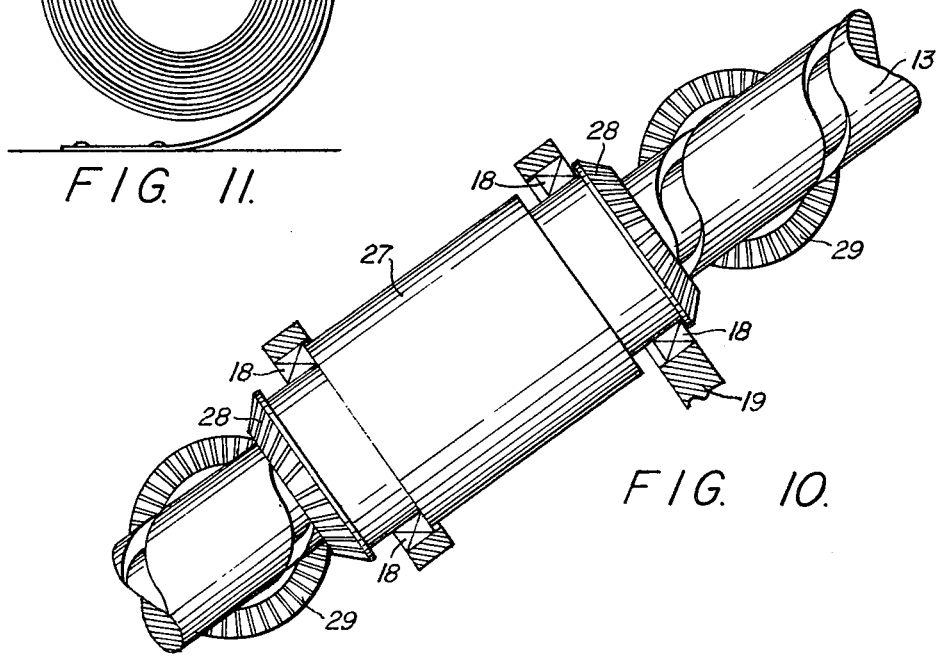

An alternative way of transmitting the rotational energy of the sleeves, here designated 27, is shown in FIGS. 9 and 10. Bevel gears 28 are affixed to respectively opposite ends of each sleeve 27 for rotation with the sleeve. As buoyant body 10 rises and drops with the variations in water level, sleeves 27 mesh alternately with corresponding upper and lower bevel gears 29 and serve to drive such gears alternately. Rotation is transmitted alternately to energy-storing springs 30, see FIG. 11, which alternately transmit their stored energy to electrical generators 31 by respective belt drives 32 and 33. The connection between the springs and the belt drives are such that the belts can turn freely as the springs are wound up, but will transmit power when the springs unwind. In this way, generators 31 are continuously powered, so as to produce a continuous supply of electrical energy.

In some instances it may be desirable to aid longitudinal movement of buoyant body 10 along the surface of the water as such buoyant body rises and falls. This will ease any strain on sleeves 17 and shafts 13. Impetus may be advantageously imparted to buoyant body 10 by means of a windlass device comprising cables 34 and 35, FIG. 1, which are connected, respectively, between such buoyant body and a fixed point 36 on the shore and such buoyant body and an anchorage 37 on footing 14. Respective motors 38 and 39 run in opposite directions, so as to wind their respective drums 40 and 41 in opposite directions, under the control of any suitable float-operated electrical system (not shown).

Figure 7:
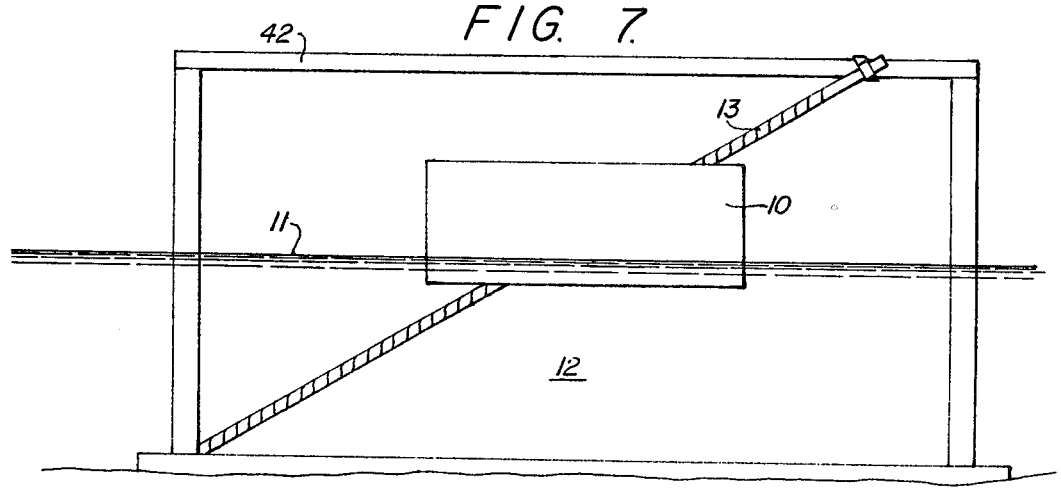

In some instances, it may be desirable to construct a frame to support shafts 13, as shown at 42 in FIG. 7. The operation of the apparatus remains the same, but shafts 13 are secured at both ends.

While it is preferred that the apparatus be used in ocean tidal basins, it may be used in any body of water whose surface level varies from time to time, e.g. in a special reservoir having inflow and outflow which can be shut off alternately to cause the water level to rise and fall as desired.

Whereas this invention is here illustrated and described with specific reference to embodiments thereof presently contemplated as the best mode of carrying out the invention in actual practice, it is to be understood that various changes may be made in adapting the invention to different embodiments, without departing from the broader inventive concepts disclosed herein and comprehended by the claims that follow.

I claim:

1. Apparatus for obtaining energy from a body of water whose surface level varies with time, comprising a buoyant body adapted to float in the water and to rise and fall with variations in the surface level of the water; at least one stationary shaft extending freely from securement adjacent to an end or ends thereof and obliquely through at least a portion of the depth of the body of water that comprehends the variations in surface level; means encircling said shaft and interconnecting the buoyant body therewith for movement longitudinally therealong; and means for converting into rotational energy the longitudinal travel of the buoyant body along the shaft as such buoyant body rises and falls with variations in water level.

2. Apparatus according to claim 1, wherein the means for converting longitudinal movement into rotational energy comprises a helical groove in and extending longitudinally of the shaft, and means engaging the helical groove and rotationally secured to the buoyant body.

3. Apparatus according to claim 2, wherein the means engaging the helical groove and rotationally secured to the buoyant body includes a sleeve concentric with and surrounding the shaft and rotationally secured to the buoyant body, the sleeve having means engaging the helical groove of the shaft so that longitudinal movement of the sleeve along the shaft causes the sleeve to rotate.

4. Apparatus according to claim 3, wherein the means engaging the helical groove is at least one roller extending into the groove from a respective indentation in the sleeve, said roller being freely mounted in the indentation.

5. Apparatus according to claim 3, wherein the means engaging the helical groove is at least one roller rotationally secured to the sleeve and arranged so that its circumference rides against the rolls on a side wall of the groove.

6. Apparatus according to claim 3, wherein means are provided for operably connecting the sleeve to a generator for generating electrical power.

7. Apparatus according to claim 6, wherein the means comprise a bull gear having the sleeve as a hub, a power transmission, and a pinion arranged to mesh with the bull gear and to drive the power transmission.

8. Apparatus according to claim 1, wherein a plurality of shafts are provided, each being similarly interconnected with the buoyant body.

9. Apparatus according to claim 1, wherein motivating means are provided to impart longitudinal motion to the buoyant body as an aid to its travel longitudinally of the shafts.

10. Apparatus according to claim 9, wherein the motivating means comprises windlass devices at opposite ends of the buoyant body.

* * * * *